(12) United States Patent
Yishay

(10) Patent No.: US 9,785,701 B2
(45) Date of Patent: Oct. 10, 2017

(54) SYSTEMS AND METHODS FOR KEYWORD SPOTTING USING ALTERNATING SEARCH ALGORITHMS

(71) Applicant: Verint Systems Ltd., Herzliya Pituach (IL)

(72) Inventor: Yitshak Yishay, Revava (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 308 days.

(21) Appl. No.: 14/604,137

(22) Filed: Jan. 23, 2015

(65) Prior Publication Data

US 2015/0213126 A1    Jul. 30, 2015

(30) Foreign Application Priority Data

Jan. 30, 2014 (IL) .......................... 230741

(51) Int. Cl.
*G06F 17/30* (2006.01)
*H04L 29/06* (2006.01)

(52) U.S. Cl.
CPC .... *G06F 17/30675* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 6,963,425 B1 * | 11/2005 | Nair | G06K 9/4652 358/1.9 |
| 7,216,162 B2 | 5/2007 | Amit et al. | |
| 7,233,699 B2 * | 6/2007 | Wenzel | G06T 7/0004 382/103 |
| 7,466,816 B2 | 12/2008 | Blair | |
| RE40,634 E | 2/2009 | Blair et al. | |
| 7,587,041 B2 | 9/2009 | Blair | |
| 9,135,497 B2 * | 9/2015 | Cerna | G06K 9/00147 |
| 2003/0174891 A1 * | 9/2003 | Wenzel | G06T 7/0004 382/209 |

(Continued)

OTHER PUBLICATIONS

Pandiselvam et al, "A Comparative Study on String Matching Algorihms of Biological Sequences", 2013.*

(Continued)

*Primary Examiner* — Hung Le
(74) *Attorney, Agent, or Firm* — Meunier Carlin & Curfman

(57) ABSTRACT

Systems and methods for spotting keywords in data packets are provided. In particular, input data is received to be searched for occurrences of a set of patterns, the input data being divided into multiple segments. Then the input data and the patterns are assigned to first and second pattern matching algorithms, the first pattern matching algorithm is configured to search only within each of the segments, and the second pattern matching algorithm is configured to search across boundaries between adjacent segments. Then the input data is searched using the first and second pattern matching algorithms.

20 Claims, 3 Drawing Sheets

(56) References Cited

U.S. PATENT DOCUMENTS

| | | | | |
|---|---|---|---|---|
| 2003/0187642 A1* | 10/2003 | Ponceleon | .......... | G10L 15/1822 704/252 |
| 2006/0161984 A1* | 7/2006 | Phillips | ................ | G06F 21/564 726/24 |
| 2007/0044060 A1* | 2/2007 | Waller | ................ | G06F 17/5081 716/52 |
| 2007/0047457 A1* | 3/2007 | Harijono | ................ | H04L 49/90 370/250 |
| 2008/0014873 A1 | 1/2008 | Krayer et al. | | |
| 2008/0201772 A1* | 8/2008 | Mondaeev | .......... | H04L 63/1408 726/13 |
| 2008/0212514 A1* | 9/2008 | Chen | .................... | H04L 1/1887 370/315 |
| 2008/0261192 A1 | 10/2008 | Huang et al. | | |
| 2008/0285464 A1 | 11/2008 | Katzir | | |
| 2009/0028143 A1* | 1/2009 | Eswaran | ............... | H04L 45/745 370/389 |
| 2010/0111287 A1* | 5/2010 | Xie | ..................... | H04M 3/5232 379/265.13 |
| 2010/0142698 A1* | 6/2010 | Spottiswoode | ..... | H04M 3/5232 379/265.11 |
| 2012/0254210 A1* | 10/2012 | Dhulipala | ......... | G06F 17/30985 707/758 |
| 2014/0212028 A1* | 7/2014 | Ciarcia | ................... | G06T 17/05 382/154 |

OTHER PUBLICATIONS

Aho, Alfred V., et al., "Efficient String Matching: An Aid to Bibliographic Search," Communication of the ACM, Jun. 1975, vol. 18, No. 6, pp. 333-340.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Goldfarb, Eithan, "Mass Link Analysis: Conceptual Analysis," Jun. 24, 2007, Version 1.1, 21 pages.

Navarro, Gonzalo, et al., "Flexible Pattern Matching in Strings: Practical On-Line Search Algorithms for Texts and Biological Sequences," Cambridge University Press, 2002, 166 pages.

Netronome SSL Inspector Solution Overview White Paper, "Examining SSL-encrypted Communications," 2010, 8 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "Integrated Digital Audio Software R&S AllAudio," Specifications, 2000, 8 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Schulzrinne, H., et al., "RTP: A Transport Protocol for Real-Time Applications," Standards Track, Jul. 2003, 89 pages.

Sheng, Lei, et al., "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

Svenson, Pontus, et al., "Social network analysis and information fusion for anti-terrorism," CIMI, 2006, 8 pages.

Tongaonkar Alok S., "Fast Pattern-Matching Techniques for Packet Filtering," Stony Brook University, May 2004, 44 pages.

Verint Systems Inc., "Mass Link Analysis: Solution Description," Dec. 2008, 16 pages.

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Usint TCAM," Proceedings of the 12th IEEE International Conference on Network Protocols (ICNP'04), 2004, 10 pages.

* cited by examiner

SYSTEMS AND METHODS FOR KEYWORD SPOTTING USING ALTERNATING SEARCH ALGORITHMS

FIELD OF THE DISCLOSURE

The present disclosure relates generally to data processing, and particularly to methods and systems for detecting keywords in data packets.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic.

Various keyword searching techniques are known in the art. For example, Aho and Corasick describe an algorithm for locating occurrences of a finite number of keywords in a string of text, in "Efficient String Matching: An Aid to Bibliographic Search," Communications of the ACM, volume 18, no. 6, June, 1975, pages 333-340, which is incorporated herein by reference. This technique is commonly known as the Aho-Corasick algorithm. As another example, Yu et al. describe a multiple-pattern matching scheme, which uses Ternary Content-Addressable Memory (TCAM), in "Gigabit Rate Packet Pattern-Matching using TCAM," Proceedings of the 12$^{th}$ IEEE International Conference on Network Protocols (ICNP), Berlin, Germany, Oct. 5-8, 2004, pages 174-183, which is incorporated herein by reference.

Other string matching algorithms are described, for example, by Navarro and Raffinot, in "Flexible Pattern Matching in Strings—Practical On-Line Search Algorithms for Texts and Biological Sequences," Cambridge University Press, 2002, which is incorporated herein by reference. Chapter 3 of this book reviews multiple string matching algorithms such as the Wu-Manber (WM) and the Set Backward Oracle Matching (SBOM) algorithms.

SUMMARY OF THE DISCLOSURE

An embodiment that is described herein provides a method, including receiving input data that is divided into multiple segments, to be searched for occurrences of a set of patterns. The input data and the patterns are assigned to first and second pattern matching algorithms, the first pattern matching algorithm is configured to search only within each of the segments, and the second pattern matching algorithm is configured to search across boundaries between adjacent segments. The input data is searched using the first and second pattern matching algorithms.

In some embodiments, the first pattern matching algorithm is faster than the second pattern matching algorithm. In other embodiments, the first and second pattern matching algorithms include respective first and second searching states, the first searching state is larger than the second searching state. In yet other embodiments, searching the input data includes initializing the first searching state when starting to analyze a given segment, and clearing the first searching state when concluding analysis of the given segment.

In an embodiment, searching the input data includes storing the second searching state when concluding analyzing a given segment, and recovering the stored second searching state when starting analysis of a following segment. In another embodiment, at least part of the first pattern matching algorithm, including the first searching state, is implemented in a hardware accelerator, and the first searching state is not retained across segment boundaries. In yet another embodiment, searching the input data includes applying the second pattern matching algorithm to a region, which begins in a first segment and ends in a second segment that follows the first segment, and a size of the region in each of the first and second segments at least matches a longest pattern among the set of patterns. In yet further another embodiment, one or more of the patterns includes at least one wildcard character, and each of the first and second pattern matching algorithms skips matching the wildcard character by suspending the respective first or second searching state until matching a non-wildcard character.

In one embodiment, searching the input data includes dividing a pattern containing the wildcard character into multiple sub-patterns that do not contain any wildcard character, searching the input data for the sub-patterns to obtain sub-pattern results, and combining the sub-pattern results.

In some embodiments, assigning the input data includes assigning a first set of patterns to the first and second pattern matching algorithms, and, upon receiving an instruction to switch to a second set of patterns, which is different from the first set, assigning the second set of patterns to the second pattern matching algorithm while analyzing a given segment using the first pattern matching algorithm, prior to restarting the second pattern matching algorithm.

There is also provided, in accordance with an embodiment that is described herein, an apparatus including an input circuit and a processor. The input circuit is configured to receive input data that is divided into multiple segments, to be searched for occurrences of a set of patterns. The processor is configured to assign the input data and the patterns to first and second pattern matching algorithms, the first pattern matching algorithm is configured to search only within each of the segments, and the second pattern matching algorithm is configured to search across boundaries between adjacent segments, and to search the input data using the first and second pattern matching algorithms.

The present disclosure will be more fully understood from the following detailed description of the embodiments thereof, taken together with the drawings in which:

DETAILED DESCRIPTION OF EMBODIMENTS

Overview

Figure 1:
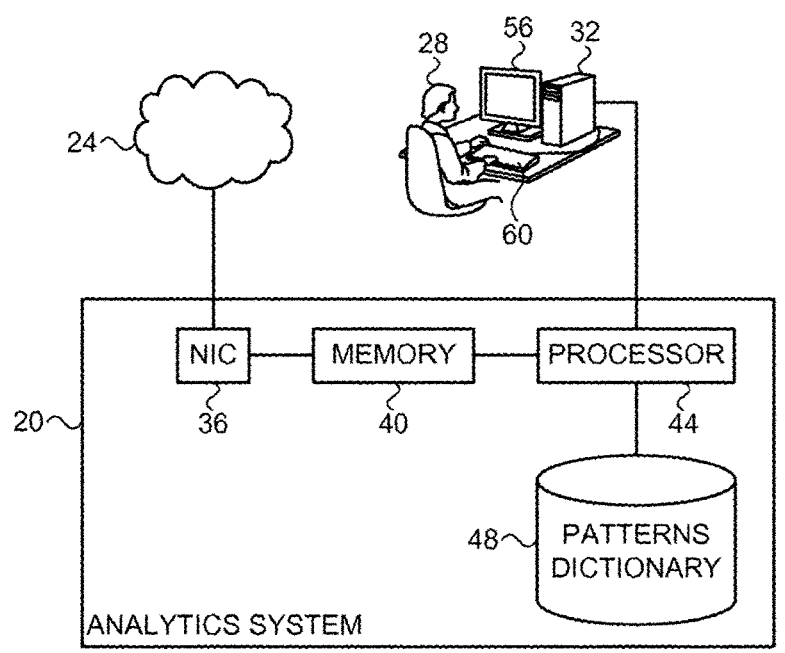
FIG. 1 is a block diagram that schematically illustrates a system for keyword searching, in accordance with an embodiment that is described herein.

Embodiments that are described herein provide improved methods and systems for keyword spotting, i.e., for identifying textual phrases of interest in input data. The disclosed keyword spotting techniques can be used, for example, in applications such as Data Leakage Prevention (DLP), Intrusion Detection Systems (IDS) or Intrusion Prevention Systems (IPS), and spam e-mail detection. In the embodiments described herein, the input data comprises multiple data segments, such as, for example, a sequence of communication packets that are exchanged in a communication network. In some cases, the segments of the input data (e.g., the communication packets) carry information over multiple logical data streams.

In the disclosed embodiments, a keyword spotting system (also referred to as an analytics system) holds a dictionary (or dictionaries) of textual phrases for searching the input data. In the description that follows, the textual phrases in the dictionary are also referred to as keywords or patterns. The input data and the keywords are made-up of characters drawn from a certain set of characters.

Algorithms for pattern matching typically scan the input data in attempt to match keywords in the dictionary to strings of characters in the input data. Some pattern matching algorithms process the input data by managing a searching state (or simply state for brevity) in memory. The state is typically defined as the information that the algorithm needs to store in order to be able to suspend the search and later resume it seamlessly from the same point.

A given string in the input data that matches some keyword in the dictionary can fully reside within the boundaries of a single packet, or can otherwise span across packets. For example, a matching string may start in one packet and end in the following packet. To detect matching strings that span across packet boundaries, the matching algorithm should retain its searching state over the transition between the two packets that together contain the matching string.

A pattern matching algorithm that retains its state between processing adjacent data segments or packets is referred to as a stateful algorithm. An algorithm that retains its state only within segment or packet boundaries is referred to as a non-stateful algorithm.

In some embodiments, retaining the searching state (or not retaining) is not inherent to the internal behavior of the algorithm, but is rather determined by external control, for example by allocating the state when starting to analyze a packet and discarding the state at the end of the packet. The terms stateful and non-stateful hold for such implementations as well.

The performance of pattern matching algorithms can be defined in terms of speed and required memory resources. A tradeoff, however, typically exists between speed and memory space requirements, as faster algorithms typically require larger searching states and vice-versa.

In principle, a keyword spotting system can employ a single algorithm for pattern matching that is fast but requires a large state in memory per flow, or a slow algorithm that requires a small size state in memory per flow. In both cases, however, the (limited) computational and storage resources are not optimally exploited, and the throughput of the system is unnecessarily limited.

On one hand, when using a single fast algorithm, retaining its large state for all concurrent flows, over the gap between the time when the processing of one packet ends and the time when the following packet (that belongs to the same data flow) arrives, prevents the system from allocating this same memory space for other concurrent searches, such as searching in other data streams in parallel. On the other hand, when searching using a single slow algorithm that has a small sized state, the maximal number of concurrent searches may be limited by computational resources rather than by storage space.

In embodiments that are described herein, a keyword spotting system employs at least two pattern matching algorithms. One algorithm is fast but has a large state. Compared to the first algorithm, the second algorithm is slower and has a smaller state. In the disclosed embodiments, the system searches for patterns using the first algorithm within the boundaries of each packet, thereby eliminating the need to store and restore the large state when transitioning between packets. The system uses the second algorithm for searching the ending and initial areas of adjacent packets, while retaining its state during the time gap between the adjacent packets. The faster algorithm thus detects matching strings within packet boundaries, whereas the slower algorithm is able to detect matching strings that span across the boundaries of adjacent packets.

It should be noted that in practical implementations the length of the packets is significantly larger than the maximal keyword length, which determines the data size to be searched by the slower algorithm (at the packet edges).

Since the slower algorithm analyzes only a small portion of each packet and occupies a small state, the combined computational and storage resources of the two algorithms are optimally exploited and the throughput of the system significantly increases compared to using a single stateful algorithm.

In some embodiments, the analytics system allows switching from one dictionary to another on the fly (e.g., for incrementally updating the dictionary or for switching to a different dictionary). In other words, at some time point, the system may receive an instruction to stop searching the input data for patterns in the currently assigned dictionary, and start searching patterns stored in a different dictionary. Alternatively, the dictionary that is currently in use may change by adding one or more keywords, and/or by deleting, and/or changing one or more of the stored keywords. Since the state of each of the matching algorithms depends on the assigned dictionary, switching between dictionaries for the algorithm that operates within packet boundaries should be delayed until the state is cleared at the packet end. For the matching algorithm that retains its state on packet transition, however, dictionaries can be switched earlier, when the switching instruction arrives while analyzing a given packet, but before the algorithm is reinitiated.

The disclosed techniques may be extended to support keywords that contain one or more wildcard characters.

System Description

FIG. 1 is a block diagram that schematically illustrates a system 20 for keyword spotting, in accordance with an embodiment that is described herein. System 20 receives communication traffic from a communication network 24, and attempts to detect in the traffic predefined textual phrases, also referred herein to as keywords or patterns. When one or more keywords are detected, the system reports the detection to a user 28 using an operator terminal 32. Alternatively or additionally, the system takes any suitable action in response to keyword detection.

System 20 can be used, for example, in an application that detects data leakage from a communication network. In applications of this sort, the presence of one or more keywords in a data item indicates that this data item should not be allowed to exit the network. Alternatively, system 20 can be used in any other suitable application in which input data is searched for occurrences of keywords, such as in intrusion detection and prevention systems, detection of spam in electronic mail (e-mail) systems, or detection of inappropriate content using a dictionary of inappropriate words or phrases.

Although the embodiments described herein refer mainly to processing of communication traffic, the disclosed techniques can also be used in other domains. For example, instead of or in addition to searching in packets of communication packets, the input data may comprise any other suitable input data that is divided into data segments. As another example, system 20 can be used for locating data of interest on storage devices, such as in forensic disk scanning applications. Certain additional aspects of keyword spotting are addressed, for example, in U.S. patent application Ser. No. 12/792,796, entitled "Systems and methods for efficient keyword spotting in communication traffic," which is assigned to the assignee of the present patent applications and whose disclosure is incorporated herein by reference. Other applications may comprise, for example, pattern matching in gene sequences in biology.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments suitable, for example, for data leakage prevention applications, but can also be used in other applications. In alternative embodiments, system 20 may receive the input data to be searched on any suitable media, such as, for example, magnetic or optical media.

Typically, network 24 comprises an Internet Protocol (IP) network, and the communication traffic comprises IP packets. The description that follows focuses on Transmission Control Protocol Internet Protocol (TCP/IP) networks and TCP packets. Alternatively, however, the methods and systems described herein can be used with other packet types, such as User Datagram Protocol (UDP) packets. Regardless of protocol, the packets searched by system 20 are referred to herein generally as input data.

In the example of FIG. 1, system 20 comprises a Network Interface Card (NIC) 36, which receives TCP packets from network 24. NIC 36 thus serves as an input circuit that receives the input data to be searched. NIC 36 stores the incoming TCP packets in a memory 40, typically comprising a Random Access Memory (RAM). A processor 44 searches the TCP packets stored in memory 40 and attempts to identify occurrences of predefined keywords in the packets.

The predefined keywords or patterns are stored in a patterns dictionary 48. Dictionary 48 may be stored on any suitable storage device. In some embodiments, dictionary 48, or part of it, may be stored in a cache memory (not shown) of processor 44 to increase the access speed by the processor. In some embodiments, dictionary 48 may comprise multiple physical or logical distinct dictionaries.

In a communication analytics system, for example, the dictionary defines textual phrases to be located in communication packets—such as e-mail addresses or Uniform Resource Locators (URLs). In other applications, the dictionary may specify any other suitable type of patterns.

In some applications, the dictionary comprises a large number of textual phrases, e.g., on the order of thousands or more, which may differ in size from one another. Each textual phrase in the dictionary typically comprises a consecutive set of characters, and in some embodiments may comprise various wildcard characters. Moreover, the dictionary may change over time, e.g., textual phrases may be added, deleted or modified. In the description that follows, the textual phrases in the dictionary are also referred to as keywords or patterns.

Following the detection of a given keyword in a given packet (or packets), processor 44 may take any suitable action. For example, processor 44 may report the detection to user 28 using an output device of terminal 32, such as a display 56. For example, the processor may issue an alert to the user and/or present the data item (e.g., packet or session) in which the keyword was detected. Additionally or alternatively, processor 44 reports statistical information regarding the detection events. In some embodiments, processor 44 may take various kinds of actions in response to detecting a keyword. For example, in a data leakage or intrusion prevention application, processor 44 may block some or all of the traffic upon detecting a keyword. User 28 may interact with system 20 using an input device of terminal 32, e.g., a keyboard 60.

The system configuration shown in FIG. 1 is an example configuration, which is chosen purely for the sake of conceptual clarity. Alternatively, any other suitable system configuration can be used. Generally, the different elements of system 20 may be implemented using software, hardware or a combination of hardware and software elements. In some embodiments, processor 44 comprises a general-purpose computer, which is programmed in software to carry out the functions described herein. The software may be downloaded to the computer in optical or electronic form, over a network, for example, or it may, additionally or alternatively, be provided and/or stored on non-transitory tangible media, such as magnetic, optical, or electronic memory. The abovementioned example methods for downloading the software are applicable also for downloading keywords to the dictionary, and for receiving input data to be searched.

Figure 2:
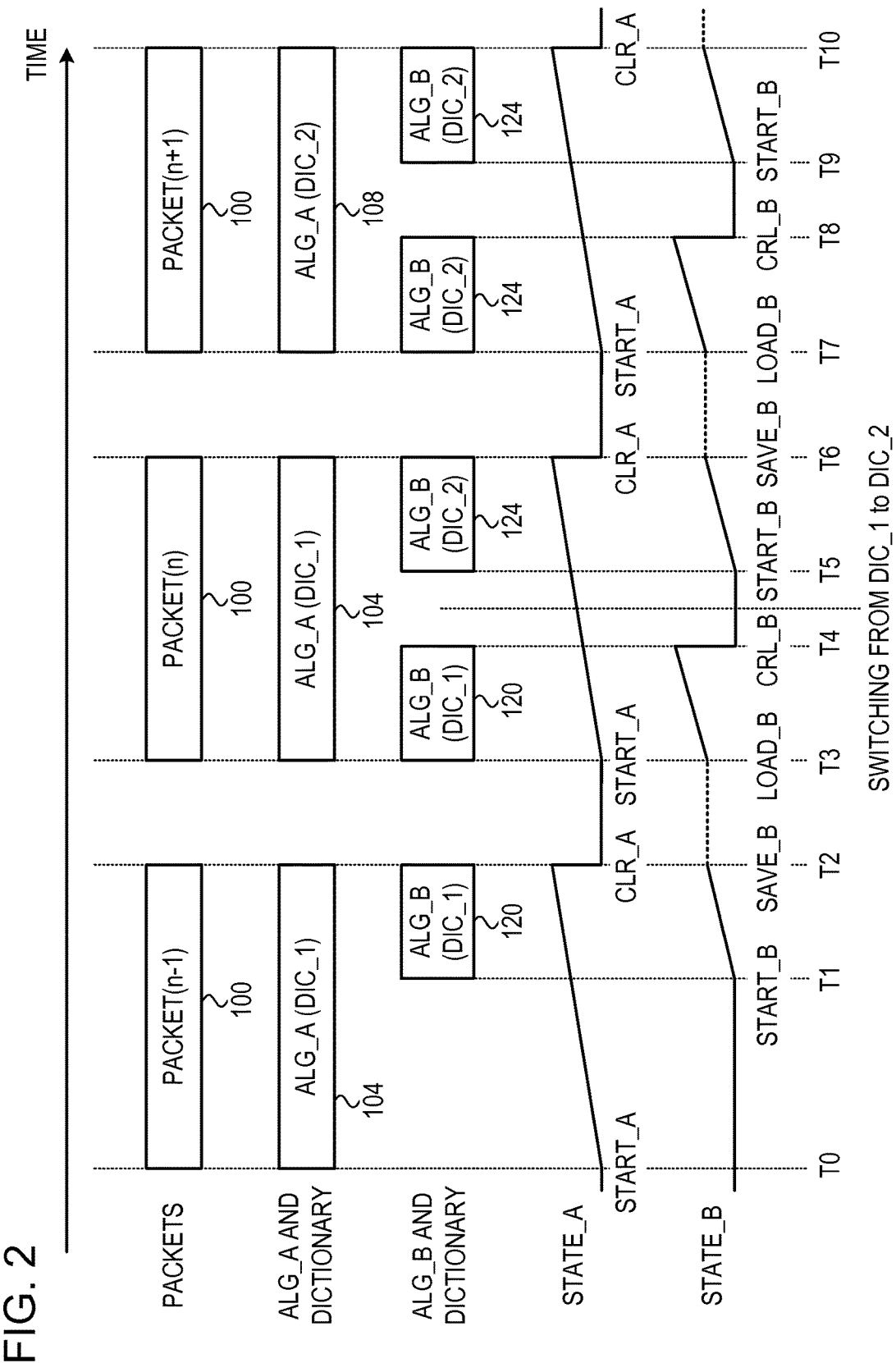
FIG. 2 is a diagram that schematically illustrates a process of keyword searching across multiple packets using alternating algorithms, in accordance with an embodiment that is described herein.

Searching Using Combination of Stateful and Non-Stateful Pattern Matching Algorithms FIG. 2 is a diagram that schematically illustrates a process of keyword searching across multiple packets using alternating pattern matching algorithms, in accordance with an embodiment that is described herein. The example of FIG. 2 is related to analytics system 20 of FIG. 1 above. The input data to system 20 comprises communication packets 100, of which three are depicted in FIG. 2, and whose order indices are denoted n−1, n, and n+1. The patterns or keywords to be searched in packets 100 are stored in dictionary 48. Time events in FIG. 2 are depicted at the bottom of the figure and denoted Ti, i=0 . . . 10. At time T0 processor 44 starts searching the input data by analyzing packet(n−1), which is assumed, in this example, the first packet to be searched in the input data stream.

In the present example, system 20 can switch between two sets of keywords or dictionaries that are denoted DIC_1 and DIC_2. In the present example, system 20 first assigns the pattern matching algorithms to search using DIC_1, and later switches to search using DIC_2. Processor 44 searches the input data using two pattern matching algorithms denoted ALG_A and ALG_B, wherein each algorithm can be assigned to either of the dictionaries DIC_1 or DIC2.

In the example of FIG. 2, ALG_A(DIC_1) 104 and ALG_A(DIC_2) 108 denote using ALG_A for searching patterns stored in DIC_1 or DIC_2 respectively. In the present example, packet(n−1), and packet(n) are analyzed by ALG_A(DIC_1) 104, whereas packet(n+1) is analyzed by ALG_A(DIC_2) 108. Similarly, ALG_B can be assigned to search the packets for matching keywords in DIC_1 or in DIC_2. Thus, ALG_B(DIC_1) 120 and ALG_B(DIC_2) 124 denote assigning ALG_B to respective dictionary DIC_1 or DIC2.

Each of the algorithms ALG_A and ALG_B comprises a searching state denoted STATE_A and STATE_B respectively. ALG_A is configured to operate only within packet boundaries, and to dismiss STATE_A outside the boundaries of each packet (i.e., non-stateful operation). In contrast, ALG_B is configured to operate on the edge parts, i.e., the initial and ending parts of each packet and to retain STATE_B across packet boundaries, and is therefore a stateful algorithm. In FIG. 2, when ALG_A or ALG_B analyzes a given packet, the progression of the respective searching state is depicted by a sloped line, e.g., between T3 and T6 when ALG_A analyzes packet(n).

In the description that follows we assume that ALG_A is fast and comprises a large searching state, whereas ALG_B is much slower but on the other hand comprises a significantly smaller state. We further assume that the size of the packets is significantly larger than the longest pattern in the dictionaries. In an example implementation, ALG_A comprises a suitable pattern matching algorithm that is implemented in hardware, and ALG_B comprises the Aho-Corasick algorithm cited above. Alternatively, however, any other suitable combination of pattern matching algorithms can be used. In some embodiments, processor 44 has limited computational resources and the pattern matching algorithm (or part thereof) is implemented in hardware to accelerate packet analysis. In such embodiments, when the state is part of the hardware implementation and is not exposed to the processor, the algorithm does not retain its state between packets and is therefore considered non-stateful.

STATE_A starts to evolve when processor 44 starts to process each packet and is cleared when the processor concludes analyzing the packet. In the figure, STATE_A starts for packets n−1, n, and n+1 at times T0, T3, and T7 respectively. STATE_A is cleared when processor 44 finishes analyzing the packets at respective times T2, T6, and T10. When STATE_A is cleared, the (large) memory space allocated for STATE_A may be freed to be used by other searching tasks.

ALG_B complements the inability of ALG_A to detect matching strings across packet boundaries. Assuming a maximal keyword length of MP_SIZE characters, it is sufficient for ALG_B to analyze the last MP_SIZE−1 characters of each packet, as well as the MP_SIZE−1 initial characters of the following packet, while retaining the searching state between processing these two parts. Thus, ALG_B can match strings that are each split into first and second substrings, such that the first substring comprises a first number of consecutive last characters of packet(n−1) and the second substring comprises a second number of the initial consecutive characters of packet(n).

In FIG. 2, for matching strings that span over both packet(n−1) and packet(n), processor 44 starts searching using ALG_B in and initializes STATE_B at T1. ALG_B then analyzes the last MP_SIZE−1 characters of packet(n−1), and when ALG_B finishes scanning packet(n−1) at T2, the processor saves the updated STATE_B. Processor 44 retains STATE_B in memory 40 (or in other memory of the processor) until packet(n) arrives at T3. At T3, processor 44 reloads the saved STATE_B and allows ALG_B to continue analyzing the initial MP_SIZE−1 characters of packet(n). At T4, processor 44 terminates ALG_B and de-allocates the memory space that was allocated to STATE_B. In general, the described processing scheme of ALG_B repeats for every pair of adjacent packets in the input data.

Assume now, that system 20 switches from matching patterns stored in dictionary DIC_1 to patterns stored in DIC_2. In the present example, the dictionaries switching is assumed to occur at some time between T4 and T5. Switching between the dictionaries when both algorithms are active is discussed further below. Since the searching state of a matching algorithm depends on the respective dictionary to which it is assigned, and since at the time of switching between the dictionaries STATE_A is in progress while ALG_A analyzes packet(n), processor 44 can safely assign ALG_A to DIC2 only after ALG_A finishes analyzing packet(n) at T6. As a result, ALG_A starts searching for DIC_2 patterns only at T7 when packet(n+1) arrives. In contrast, since processor 44 clears or de-allocates STATE_B at T4 (i.e., before the switching between the dictionaries occurs), the processor can assign ALG_B to DIC_2 before analyzing the last MP_SIZE−1 characters of packet(n). Thus, when the instruction to switch between the dictionaries arrives while analyzing the packet, but prior to restarting ALG_B, ALG_B responses earlier than ALG_A to the switching instruction.

AS another example, assume that the instruction to switch between the dictionaries arrives between T3 and T4. In this case, ALG_B can safely switch to DIC_2 at T5, and ALG_A at T7. As yet another example, assume that the instruction for dictionary switching arrives between T5 and T6. In this example the first opportunity for ALG_B to safely switch to DIC_2 is at T9 (or generally between T8 and T9).

To summarize: when the dictionary switching instruction arrives between T3 and T5, ALG_B can search patterns in DIC_2 including the transition between packet(n) and packet(n+1). If on the other hand the switching instruction arrives between T5 and T6, ALG_B can start search patterns in DIC_2 only on the next packet transition, i.e., from packet (n+1) to packet(n+2) (not shown). Thus, if the dictionary switching occurs between T3 and T6, since the interval T3-T5 is much longer than T5-T6, the probability to start searching patterns in DIC_2 starting at the current packet transition is much higher. When, however, the switching occurs during the interval T2-T3 (i.e., during the time gap between packets), which is typically much larger than T3-T6), ALG_A may switch to DIC_2 at T3, but ALG_B should continue searching patterns in DIC_1 at least until T4. In other words, when switching the dictionary, each of the pattern searching algorithms can start using the new dictionary when it is restarted with a cleared state, such as at T3 for ALG_A or at T5 for ALG_B.

Figure 3:
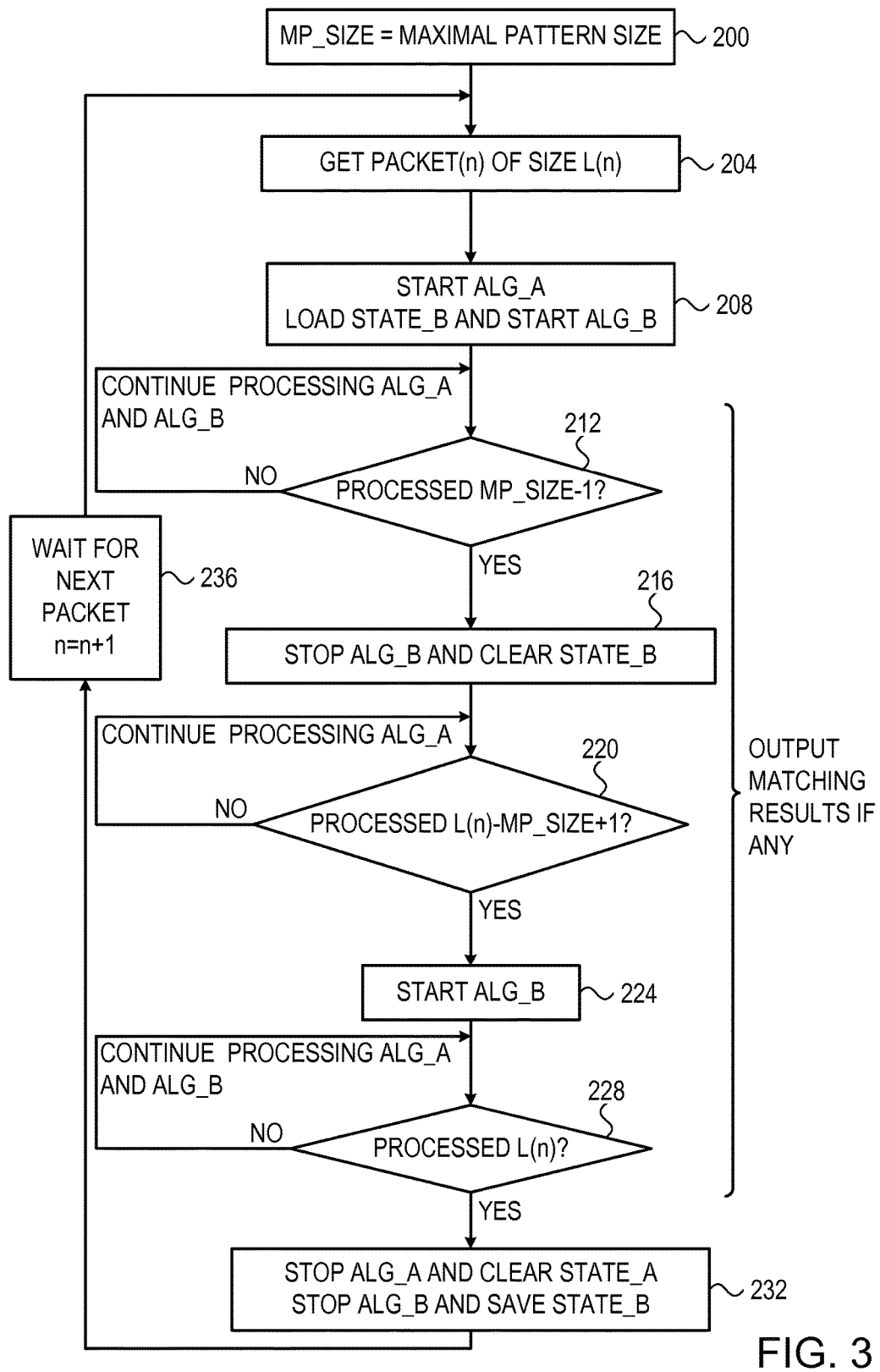
FIG. 3 is a flow chart that schematically illustrates a method for keyword searching within and across packet boundaries, in accordance with an embodiment that is described herein.

FIG. 3 is a flow chart that schematically illustrates a method for keyword searching within and across packet boundaries. The description of the method refers to the diagram depicted in FIG. 2, using the matching algorithms ALG_A and ALG_B and describes the processing of packet (n). The method begins with processor 44 defining, or otherwise receiving (e.g., from user 28), the maximal length (MP_SIZE) among the keywords stored in dictionary 48, at a pattern size definition step 200. Step 200 may be executed only once when dictionary 48 (e.g., DIC_1) is assigned to the matching algorithms.

At a packet receiving step 204, processor 44 gets packet (n) for analysis. The communication packets, including packet(n) whose serial number is n, are received by network 24, and stored in memory 40. The number of characters to be analyzed in packet(n) is denoted L(n).

At a non-stateful algorithm initialization step 208, processor 44 allocates memory space for STATE_A and start executing ALG_A. Further at step 208, processor 44 reloads a previously saved STATE_B (i.e., STATE_B was saved when the processor has finished analyzing the n−1$^{th}$ packet) and starts executing ALG_B to analyze the first MP_SIZE−1 characters of packet(n). Step 208 corresponds to T3 in FIG. 2. Note that at the beginning of step 208, STATE_B possibly reflects the detection of the initial substring of a matching string that is split between packet(n−1) and packet(n).

At an ALB_B termination checking step 212, processor 44 checks whether ALG_B has concluded analyzing the first MP_SIZE−1 characters of packet(n). If the result at step 212 is negative, processor 44 continues to execute both ALG_A and ALG_B and outputs any matching results (detected by either of the two algorithms) if any. If at step 212 the result is positive, processor 44 terminates the execution of ALG_B and de-allocates STATE_B at an ALG_B termination step 216, which corresponds to T4 in FIG. 2.

At an ALG_B restart checking step 220, processor 44 waits until ALG_A finishes scanning the first L(n)-MP_SIZE+1 characters of packet(n), and then initializes ALG_B, at a stateful initialization step 224. At step 224, processor 44 allocates memory space for STATE_B and starts executing ALG_B to analyze the last MP_SIZE−1 characters of packet (n). Step 224 corresponds to T5 in FIG. 2, although not necessarily with switching to another dictionary as depicted in FIG. 2 above.

At an end of packet waiting step 228, processor 44 waits for ALG_A to finish analyzing all the L(n) characters of packet(n) (corresponding to T6 in FIG. 2), and then proceeds to an ALG_A termination step 232. At step 232, processor 44 terminates the execution of ALG_A and clears or de-allocates STATE_A. Further at step 232, processor 44 stops the execution of ALG_B and saves STATE_B e.g., in memory 40. Following step 232, processor 44 waits for the following packet to arrive, at an input waiting step 236, and when the following packet arrives, the processor loops back to step 204 to process the packet.

The configurations in the methods described above are exemplary configurations and other suitable configurations can also be used. For example, when the processor executes each of the two matching algorithms, it allocates suitable amount memory space for the respective searching state, and de-allocates the memory space when terminating the algorithm. In alternative embodiments, however, instead of allocating memory space and then de-allocating it, the respective memory space is allocated once and cleared at algorithm termination to be used for other searching tasks without the possible overhead of repeated operations of memory re-allocation.

The embodiments described above mainly support keywords that comprise non-wildcard characters. A wildcard character is a special character that may be substituted for any other character or string. Some keyword spotting systems are required to support keywords that may contain one or more wildcard characters that may each be substituted with some string of known or unknown length (referred to herein as wildcard keywords).

The consecutive non-wildcard characters of a wildcard keyword comprise one or more ordered substrings that are separated by the wildcard characters. As an example, consider a wildcard keyword comprising a left substring and a right substring that are separated by a single wildcard character.

In an embodiment, the ordered substrings of the wildcard keyword are saved in dictionary 48 with association to one another. The matching algorithm searches the input data to orderly match the substrings. When fully detecting one of the substrings, the matching algorithm suspends the searching state until it starts to detect the next ordered substring. To match the full wildcard keyword, each of the respective non-wildcard substrings should be matched to the respective substrings in the dictionary. In some embodiments, to support keywords with wildcard characters that may be substituted with a string of unknown length, the pattern matching algorithm allocates an additional combining state. In alternative embodiments, instead of allocating an additional state, system 20 searches each of the substrings separately, and applies (e.g., via an external rule engine) some suitable combining rule to achieve an equivalent wildcard keyword matching. Combining the substrings using a combining rule is typically carried out at a processing level higher than the processing level of the pattern matching algorithms. An example combining rule may determine, for example, the ordering rule of the matched substrings.

In some embodiments, when the wildcard character defines a replaceable string of known maximal length, the keyword containing the wildcard character can be replaced with a finite number of strings that may be all put as patterns in the dictionary. In such embodiments, the pattern search algorithms may search the wildcard keyword as any other pattern in the dictionary.

In the embodiments described above keyword matching is performed using two matching algorithms of which one is stateful and the other is non-stateful. In alternative embodiments, system 20 may execute in parallel more than a single stateful and/or non-stateful algorithm.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving input data that is divided into multiple segments, to be searched for occurrences of a set of patterns;
   assigning the input data and the patterns to first and second pattern matching algorithms, wherein the first pattern matching algorithm is configured to search only within each of the segments, and the second pattern matching algorithm is configured to search across boundaries between adjacent segments; and
   searching the input data using the first and second pattern matching algorithms.

2. The method according to claim 1, wherein the first pattern matching algorithm is faster than the second pattern matching algorithm.

3. The method according to claim 1, wherein the first and second pattern matching algorithms comprise respective first and second searching states, wherein the first searching state is larger than the second searching state.

4. The method according to claim 3, wherein searching the input data comprises initializing the first searching state when starting to analyze a given segment, and clearing the first searching state when concluding analysis of the given segment.

5. The method according to claim 3, wherein searching the input data comprises storing the second searching state when concluding analyzing a given segment, and recovering the stored second searching state when starting analysis of a following segment.

6. The method according to claim 3, wherein at least part of the first pattern matching algorithm, including the first searching state, is implemented in a hardware accelerator, and wherein the first searching state is not retained across segment boundaries.

7. The method according to claim 1, wherein searching the input data comprises applying the second pattern matching algorithm to a region, which begins in a first segment and ends in a second segment that follows the first segment, wherein a size of the region in each of the first and second segments at least matches a longest pattern among the set of patterns.

8. The method according to claim 1, wherein one or more of the patterns comprise at least one wildcard character, and wherein each of the first and second pattern matching algorithms skips matching the wildcard character by suspending the respective first or second searching state until matching a non-wildcard character.

9. The method according to claim 8, wherein searching the input data comprises dividing a pattern containing the wildcard character into multiple sub-patterns that do not contain any wildcard character, searching the input data for the sub-patterns to obtain sub-pattern results, and combining the sub-pattern results.

10. The method according to claim 1, wherein assigning the input data comprises assigning a first set of patterns to the first and second pattern matching algorithms, and, upon receiving an instruction to switch to a second set of patterns, which is different from the first set, assigning the second set of patterns to the second pattern matching algorithm while analyzing a given segment using the first pattern matching algorithm, prior to restarting the second pattern matching algorithm.

11. An apparatus, comprising:
an input circuit, which is configured to receive input data that is divided into multiple segments, to be searched for occurrences of a set of patterns; and
a processor, which is configured to assign the input data and the patterns to first and second pattern matching algorithms, wherein the first pattern matching algorithm is configured to search only within each of the segments, and the second pattern matching algorithm is configured to search across boundaries between adjacent segments, and to search the input data using the first and second pattern matching algorithms.

12. The apparatus according to claim 11, wherein the first pattern matching algorithm is faster than the second pattern matching algorithm.

13. The apparatus according to claim 11, wherein the first and second pattern matching algorithms comprise respective first and second searching states, wherein the first searching state is larger than the second searching state.

14. The apparatus according to claim 13, wherein the processor is configured to initialize the first searching state when starting to analyze a given segment, and to clear the first searching state when concluding analysis of the given segment.

15. The apparatus according to claim 13, wherein the processor is configured to store the second searching state when concluding analyzing a given segment, and to recover the stored second searching state when starting analysis of a following segment.

16. The apparatus according to claim 13, wherein at least part of the first pattern matching algorithm, including the first searching state, is implemented in a hardware accelerator, and wherein the first searching state is not retained across segment boundaries.

17. The apparatus according to claim 11, wherein the processor is configured to apply the second pattern matching algorithm to a region, which begins in a first segment and ends in a second segment that follows the first segment, wherein a size of the region in each of the first and second segments at least matches a longest pattern among the set of patterns.

18. The apparatus according to claim 11, wherein one or more of the patterns comprise at least one wildcard character, and wherein the processor is configured to skip matching the wildcard character by suspending the respective first or second searching state until matching a non-wildcard character.

19. The apparatus according to claim 18, wherein the processor is configured to search the input data by dividing a pattern containing the wildcard character into multiple sub-patterns that do not contain any wildcard character, searching the input data for the sub-patterns to obtain sub-pattern results, and combining the sub-pattern results.

20. The apparatus according to claim 11, wherein the processor is configured to assign a first set of patterns to the first and second pattern matching algorithms, and, upon receiving an instruction to switch to a second set of patterns, which is different from the first set, to assign the second set of patterns to the second pattern matching algorithm while analyzing a given segment using the first pattern matching algorithm, prior to restarting the second pattern matching algorithm.

* * * * *